US010656481B2

(12) United States Patent
Ootsu et al.

(10) Patent No.: US 10,656,481 B2
(45) Date of Patent: May 19, 2020

(54) LIQUID CRYSTAL DISPLAY DEVICE

(71) Applicant: Panasonic Liquid Crystal Display Co., Ltd., Himeji-shi, Hyogo (JP)

(72) Inventors: Ryouichi Ootsu, Hyogo (JP); Hiroaki Iwato, Hyogo (JP)

(73) Assignee: PANASONIC LIQUID CRYSTAL DISPLAY CO., LTD., Hyogo (JP)

(*) Notice: Subject to any disclaimer, the term of this patent is extended or adjusted under 35 U.S.C. 154(b) by 0 days.

(21) Appl. No.: 15/941,934

(22) Filed: Mar. 30, 2018

(65) Prior Publication Data

US 2019/0302547 A1    Oct. 3, 2019

(51) Int. Cl.
  *G02F 1/1362* (2006.01)
  *G02F 1/1335* (2006.01)
  *G02F 1/1368* (2006.01)
  *G02F 1/1343* (2006.01)
  *G02F 1/1333* (2006.01)
  *G02F 1/135* (2006.01)
  *G02B 5/00* (2006.01)

(52) U.S. Cl.
  CPC ...... *G02F 1/136204* (2013.01); *G02F 1/1368* (2013.01); *G02F 1/133351* (2013.01); *G02F 1/133512* (2013.01); *G02F 1/133516* (2013.01); *G02F 1/134363* (2013.01); *G02F 1/136286* (2013.01); *G02B 5/003* (2013.01); *G02F 1/133514* (2013.01); *G02F 2001/1351* (2013.01); *G02F 2001/1352* (2013.01)

(58) Field of Classification Search
  CPC ......... G02F 1/136204; G02F 1/133351; G02F 1/133512; G02F 1/133516; G02F 1/134363; G02F 1/136286; G02F 1/1368; G02F 2001/1351; G02F 1/133514; G02F 2001/1352; G02B 5/003
  See application file for complete search history.

(56) References Cited

U.S. PATENT DOCUMENTS

| | | | |
|---|---|---|---|
| 8,427,617 B2 | 4/2013 | Tanaka et al. | |
| 2004/0263753 A1* | 12/2004 | Woo | G02F 1/133512 349/141 |
| 2012/0127388 A1* | 5/2012 | Nakayoshi | G02F 1/136213 349/43 |
| 2014/0049717 A1* | 2/2014 | Kwak | G02F 1/133512 349/43 |
| 2014/0097430 A1* | 4/2014 | Park | H01L 27/1218 257/48 |

(Continued)

FOREIGN PATENT DOCUMENTS

JP    2017015787 A  *  1/2017  .......... G02F 1/1333

*Primary Examiner* — Hoan C Nguyen
(74) *Attorney, Agent, or Firm* — Hamre, Schumann, Mueller & Larson, P.C.

(57) ABSTRACT

A liquid crystal display device is disclosed. The liquid crystal display device includes a display panel that includes four sides. One of the four sides has a cut edge. The display panel includes a display region in which an image is to be displayed; a non-display region that surrounds the display region and that includes a non-light transmitting layer that restricts light transmission therethrough; and a plurality of slits disposed in the non-light transmitting layer. An edge of the non-light transmitting layer is co-planar with the cut edge. The plurality of slits are parallel to the cut edge.

20 Claims, 12 Drawing Sheets

(56) References Cited

U.S. PATENT DOCUMENTS

| | | | |
|---|---|---|---|
| 2014/0098005 A1* | 4/2014 | Kim | G06F 3/1446 345/1.3 |
| 2016/0202526 A1* | 7/2016 | Shim | G02F 1/13394 257/72 |
| 2017/0017101 A1* | 1/2017 | Morita | G02F 1/13394 |
| 2017/0219872 A1 | 8/2017 | Ibaraki et al. | |

* cited by examiner

LIQUID CRYSTAL DISPLAY DEVICE

FIELD

This disclosure relates generally to an electronic display device. More specifically, the disclosure relates to an electronic display device such as, but not limited to, a liquid crystal display device.

BACKGROUND

A liquid crystal display (LCD) device is an electronic display that is widely used as a display for electronic devices such as computers, televisions, cellular phones, and the like. An LCD device generally includes a thin film transistor (TFT) substrate and a color filter substrate. A liquid crystal layer is disposed between the TFT substrate and the color filter substrate.

SUMMARY

This disclosure relates generally to an electronic display device. More specifically, the disclosure relates to an electronic display device such as, but not limited to, a liquid crystal display device.

In an embodiment, an electronic display device is a liquid crystal display device.

In an embodiment, the liquid crystal display device is an in-plane switching (IPS) mode liquid crystal display device.

In an embodiment, the electronic display device is included as a display for an electronic device such as, but not limited to, a display for a laptop computer, a display for a tablet computer, a display for a desktop computer, or the like.

A liquid crystal display device is disclosed. The liquid crystal display device includes a display panel that includes four sides. One of the four sides has a cut edge. The display panel includes a display region in which an image is to be displayed. A non-display region surrounds the display region and includes a non-light transmitting layer that restricts light transmission therethrough. A plurality of slits is disposed in the non-light transmitting layer. An edge of the non-light transmitting layer is co-planar with the cut edge. The plurality of slits are parallel to the cut edge.

A liquid crystal display device is disclosed. The liquid crystal display device includes a display panel having a display region that includes a plurality of gate lines and a plurality of drain lines. A black matrix overlaps the plurality of drain lines and the plurality of gate lines. A plurality of slits is formed in the black matrix.

A method of manufacturing a liquid crystal display device is disclosed. The method includes forming a display panel having a display region in which an image is to be displayed and a non-light transmitting layer surrounding the display region, the non-light transmitting layer restricts light transmission therethrough. The method further includes forming a plurality of slits in the non-light transmitting layer; and cutting the display panel along a cut line extending between two slits from the plurality of slits and the cut line in parallel with the plurality of slits.

BRIEF DESCRIPTION OF THE DRAWINGS

References are made to the accompanying drawings that form a part of this disclosure, and which illustrate embodiments in which the systems and methods described in this specification can be practiced.

Like reference numbers represent like parts throughout.

DETAILED DESCRIPTION

This disclosure relates generally to an electronic display device. More specifically, the disclosure relates to an electronic display device such as, but not limited to, a liquid crystal display device.

In general, a shape of a liquid crystal display device may be selected so that the device has an elongated shape. For example, a liquid crystal display device may be a rectangular shape in which a length of the liquid crystal display device is greater than a height of the liquid crystal display device. One example of elongated liquid crystal display devices can be found, for example, in a subway system for displaying signs including directions. Such configurations may not include a standard size. Accordingly, manufacturing costs can be increased to customize each liquid crystal display device.

Embodiments described in this specification are directed to a liquid crystal display device having a customizable shape (e.g., an elongated rectangular shape, etc.) which may be manufactured by manufacturing a standard sized and shaped liquid crystal display device, and cutting the standard sized and shaped liquid crystal display device according to the particular sizing desired. It will be appreciated that such cutting can form a selected size (e.g., an elongated liquid crystal display device having a length that is larger than a height, or in another embodiment, the height can be larger than the length, etc.).

When cutting a liquid crystal display device, a non-light transmitting layer (e.g., a black matrix), may be exposed on an edge of a color substrate of the liquid crystal display device. Because the black matrix may be formed from a material having a low conductivity, but that is not an insulator (e.g., carbon, etc.), static electricity may be propagated from the exposed edge. The static electricity can, for example, impact an electric field between common and pixel electrodes in a display region. This electric field formation can result in deterioration of the image being displayed.

Embodiments described herein may include a plurality of slits formed in the non-light transmitting layer (e.g., the black matrix). The plurality of slits may cause a buffer of spacing in the non-light transmitting layer. In an embodiment, the buffer of spacing may reduce a propagation of the electric field caused by static electricity. In an embodiment, the plurality of slits can result in a higher quality image by reducing the propagation of the static electricity to the pixel electrodes.

Figure 1A:
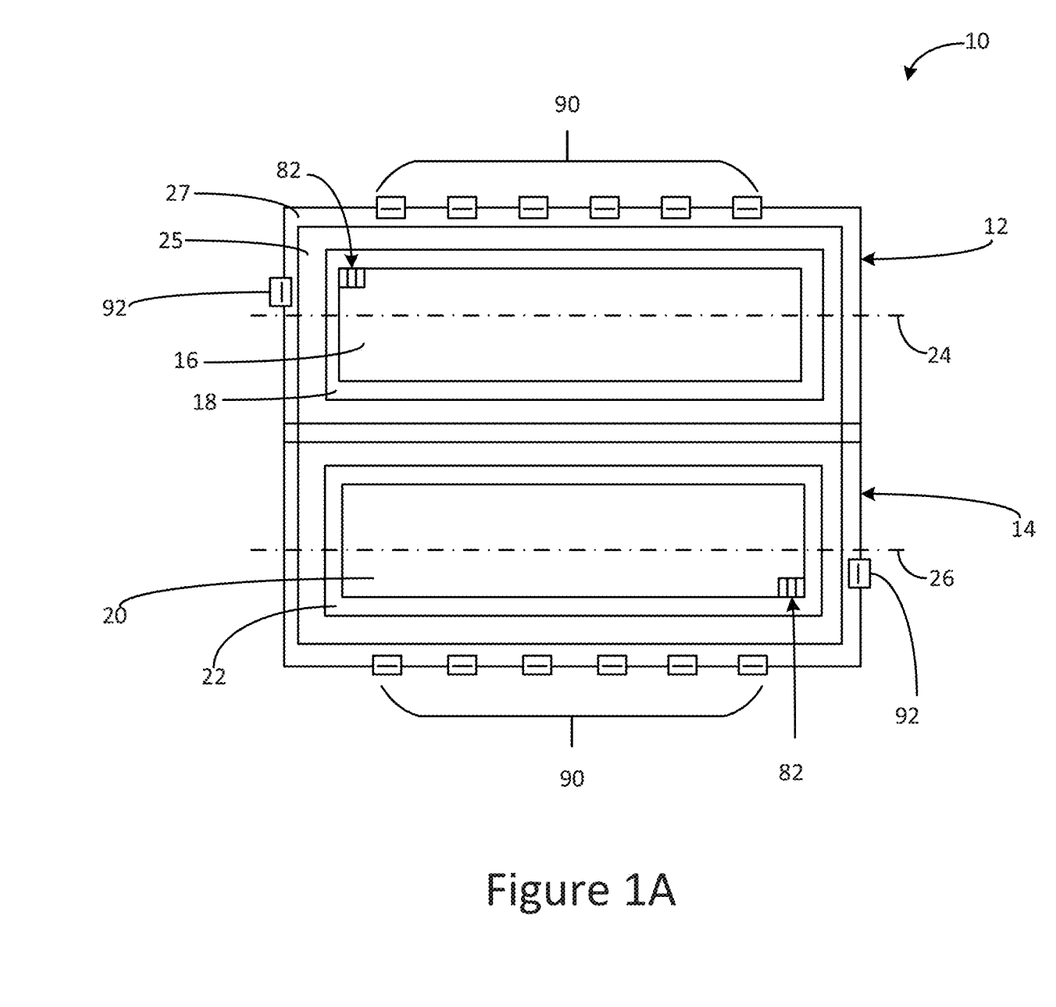
FIG. 1A illustrates a plurality of liquid crystal display devices formed together, according to an embodiment.

FIG. 1A illustrates a partially finished liquid crystal display device 10 including a plurality of liquid crystal display panels 12, 14 formed together, according to an embodiment. The first liquid crystal display panel 12 and the second liquid crystal display panel 14 may be the same as or similar to each other, according to an embodiment. In an embodiment, there can be more than two liquid crystal display panels 12, 14 on the liquid crystal display device 10. In an embodiment, the liquid crystal display device 10 can include either the first liquid crystal display panel 12 or the second liquid crystal display panel 14.

The first liquid crystal display panel 12 includes a display region 16 and a non-display region 18 that surrounds the display region 16. The non-display region 18 may be in a frame shape surrounding the display region 16. It will be appreciated that the non-display region 18 may be a non-light transmitting layer such as, but not limited to, a black matrix. A cut line 24 is illustrated showing a location along which the first liquid crystal display panel 12 may be cut to form a liquid crystal display panel having a selected size that is different from a standard size and shape (e.g., an elongated liquid crystal display panel, etc.).

The second liquid crystal display panel 14 includes a display region 20 and a non-display region 22 that surrounds the display region 20. The non-display region 22 may be in a frame shape surrounding the display region 20. It will be appreciated that the non-display region 22 may be a non-light transmitting layer such as, but not limited to, a black matrix. A cut line 26 is illustrated showing a location along which the second liquid crystal display panel 14 may be cut to form a liquid crystal display panel having a selected size that is different from a standard size and shape (e.g., an elongated liquid crystal display panel, etc.).

The first and second liquid crystal display panels 12, 14 include a color filter (CF) substrate 25 and a thin film transistor (TFT) substrate 27. The TFT substrate 27 is larger in size than the CF substrate 25 such that portions of the TFT substrate 27 extend further (e.g., so that the edges of the TFT substrate 27 are visible in the illustrated embodiment) than the CF substrate 25.

A liquid crystal layer (not shown) is sandwiched between the CF substrate 25 and the TFT substrate 27. A backlight (not shown) radiates light from a back surface side. The first and second liquid crystal display panels 12, 14 may be supported between an upper frame arranged on a first side of the first and second liquid crystal display panels 12, 14 (front surface side of the CF substrate 25) and a lower frame arranged on a second side of the first and second liquid crystal display panels 12, 14 (back surface side of the TFT substrate 27).

The CF substrate 25 includes the non-light transmitting layers 18, 22 (black matrix) that can restrict transmission of light therethrough and a colored layer (e.g., a red color filter, a green color filter, and a blue color filter) that can transmit light formed on a glass substrate. An overcoat layer may be formed to cover the non-light transmitting layers 18, 22 (black matrix) and the colored layer.

A pixel 82 is shown in the display region 16 and the display region 20. It will be appreciated that the display regions 16, 20 include a plurality of pixels 82 arranged in a matrix (both the length direction (left-right with respect to the figure) and the height direction (up-down with respect to the figure)). The pixels 82 are shown in a block of three, as each pixel 82 includes a red subpixel, a green subpixel, and a blue subpixel. The pixels 82 are described in additional detail in FIGS. 3 and 4 below.

Each of the liquid crystal display panels 12, 14, includes a source driver 90 and a gate driver 92. In an embodiment, the source driver 90 can alternatively be referred to as the source driving circuit 90 and the gate driver 92 can alternatively be referred to as the gate driving circuit 92. The source driver 90 and the gate driver 92 are described in additional detail in accordance with FIG. 3 below.

Figure 1B:
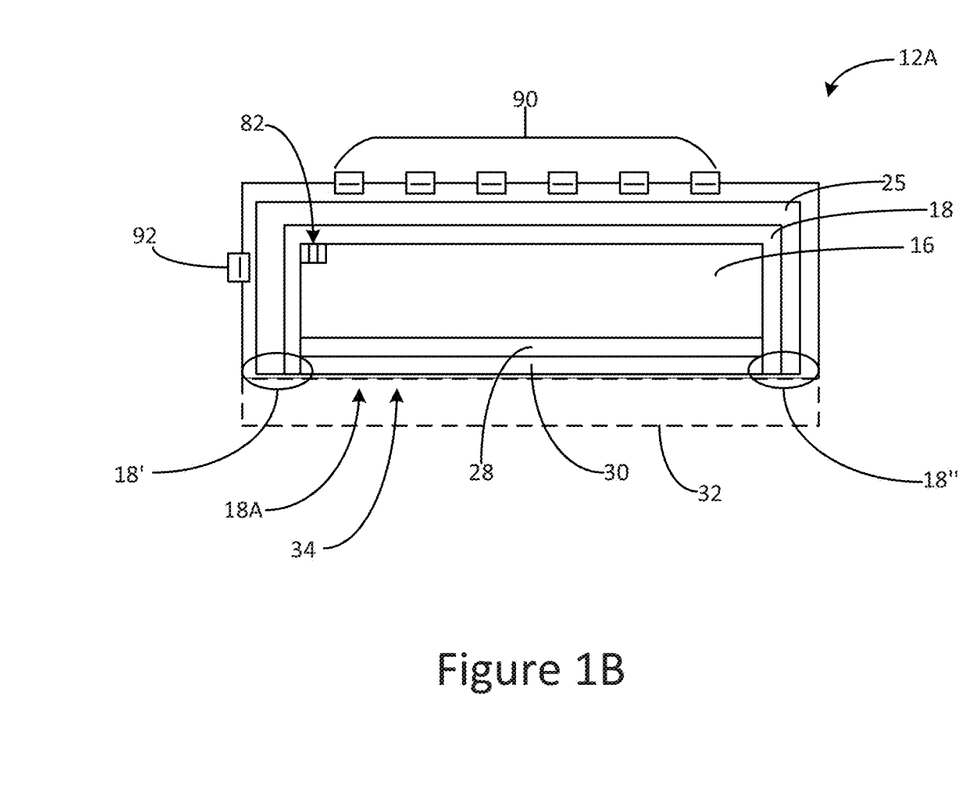
FIG. 1B illustrates one of the plurality of liquid crystal display devices having been cut to form an elongated liquid crystal display device, according to an embodiment.

FIG. 1B illustrates one of the plurality of liquid crystal display panels 12, 14 having been cut to form an elongated liquid crystal display panel 12A, according to an embodiment. In the illustrated embodiment, the liquid crystal display panel 12A is generally rectangular and has a length (left-right direction with respect to the page) that is larger than a height (up-down direction with respect to the page). In the illustrated embodiment, the first liquid crystal display panel 12 was cut along the cut line 24. For purposes of illustration, a dashed line 32 is shown identifying an area which would be occupied in a standard size of liquid crystal display panel (e.g., the first liquid crystal display panel 12 in FIG. 1A prior to being cut along cut line 24).

The liquid crystal display panel 12A includes the display region 16 and the non-display region 18. Because of the cutting along the cutting line 24, a cut edge 18A of the CF substrate 25 is exposed along a bottom side (with respect to the figure) of the display panel 12A. As a result, the non-display region 18 (e.g., black matrix) is exposed at locations 18' and 18" (e.g., a left-side and a right-side of the cut edge 18A of the display panel 12A). Also because of the cutting along the cut line 24, the non-display region 18 along the bottom side (with respect to the figure) of the display panel 12A does not include the black matrix (e.g., the non-display region 18 as in the remaining uncut sides). Accordingly, two additional regions 28, 30 are shown in the illustrated embodiment.

The first region 28 is shown in which a black image is initially set to display. TFT arrays are formed in an area of the TFT substrate 27 overlapping the first region 28. In an embodiment, at or about 10 pixels may be displayed as the first region 28. It will be appreciated that an actual number of black pixels can vary above or below 10, according to an embodiment. TFT arrays are not formed in an area of the TFT substrate 27 overlapping the second region 30. The color filters and black matrix are formed in an area of the CF substrate 25 overlapping the second region 30. Thus the color filters and black matrix are co-planar with the cut edge 18A of the CF substrate 25.

The second region 30 may be covered by a shielding tape or the like that shields light from transmitting therethrough. Accordingly, the first region 28 and the second region 30 collectively form a non-display region 34 that provides a function corresponding to the black matrix in the non-display region 18 that would be present in an uncut liquid crystal display panel (e.g., liquid crystal display panel 12). In an embodiment, the exposed locations 18' and 18" of the non-display region 18 can propagate static electricity to the common and pixel electrodes of the liquid crystal display panel 12A.

Figure 2A:
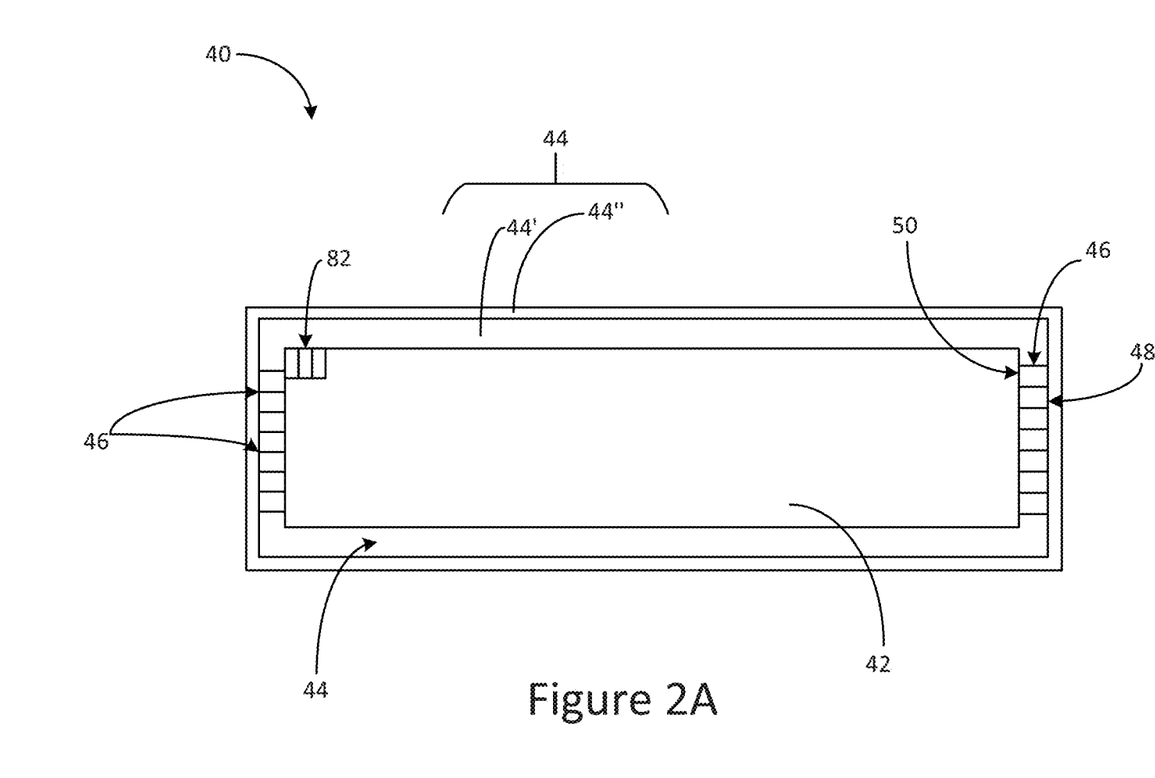
FIG. 2A illustrates a color filter substrate of a standard sized liquid crystal display device, according to an embodiment.

FIG. 2A illustrates a CF substrate 40 of a standard sized liquid crystal display panel (e.g., liquid crystal display panel 12 or 14 in FIG. 1A), according to an embodiment. For simplicity of this specification, FIG. 2A illustrates the CF substrate 40 without a TFT substrate (e.g., the TFT substrate 27 in FIGS. 1A, 1B), liquid crystal layer, and the like. The CF substrate 40 may include aspects that are the same as or similar to aspects of a standard sized CF substrate, as shown in the CF substrate 25 of the liquid crystal display panel 12 in FIG. 1A. The CF substrate 40 includes a display region 42 and a non-display region 44 that surrounds the display region 42. The non-display region 44 includes a non-light transmitting layer 44' that restricts light transmission therethrough (e.g., a black matrix). In the non-display region 44, a periphery region 44" surrounds the non-light transmitting layer 44' and is a transparent area, which can prevent static electricity from propagating through the non-light transmitting layer 44'.

A plurality of slits 46 are formed in the non-light transmitting layer 44' of the non-display region 44. In the illustrated embodiment, the plurality of slits 46 is formed along a left-side of the non-light transmitting layer 44' and along a right-side of the non-light transmitting layer 44'. In the illustrated embodiment, the slits 46 are oriented about parallel to a lengthwise direction of the CF substrate 40. In such an embodiment, the slits 46 are oriented about parallel to a cut edge (e.g., the cut edge 54 in FIG. 2B). It will be appreciated that the slits 46 can alternatively or additionally be formed on a top-side and a bottom-side of the non-display region 44. In such an embodiment, the slits would be oriented in a direction that is about parallel to a height direction of the display panel 40. That is, the plurality of slits would be oriented about perpendicular to the plurality of slits 46 that are illustrated in FIG. 2A.

The non-light transmitting layer 44' includes a first edge 48 and a second edge 50. The first edge 48 forms an outer extent of the non-light transmitting layer 44' and the second edge 50 forms an inner extent of the non-light transmitting layer 44'. In other words, the first edge 48 represents an outer perimeter of the non-light transmitting layer 44' and the second edge 50 represents an inner perimeter of the non-light transmitting layer 44'.

The plurality of slits 46 are illustrated as extending from the first edge 48 to the second edge 50. In an embodiment, the slits 46 can extend entirely across the non-light transmitting layer 44'. In an embodiment, the slits 46 can extend from the first edge 48 a partial distance toward the second edge 50. In an embodiment, the slits 46 can extend from the second edge 50 a partial distance toward the first edge 48. In this manner, it is possible for the slits 46 to extend entirely across the non-light transmitting layer 44' or to partially extend across the non-light transmitting layer 44'. The non-light transmitting layer 44' may function as a path of static electricity. The slits 46 may hinder static electricity from propagating through the non-light transmitting layer 44'. It will be appreciated that the slits 46 may be relatively more effective at reducing an electric field impact when the slits 46 extend entirely across the non-light transmitting layer 44'.

Figure 2B:
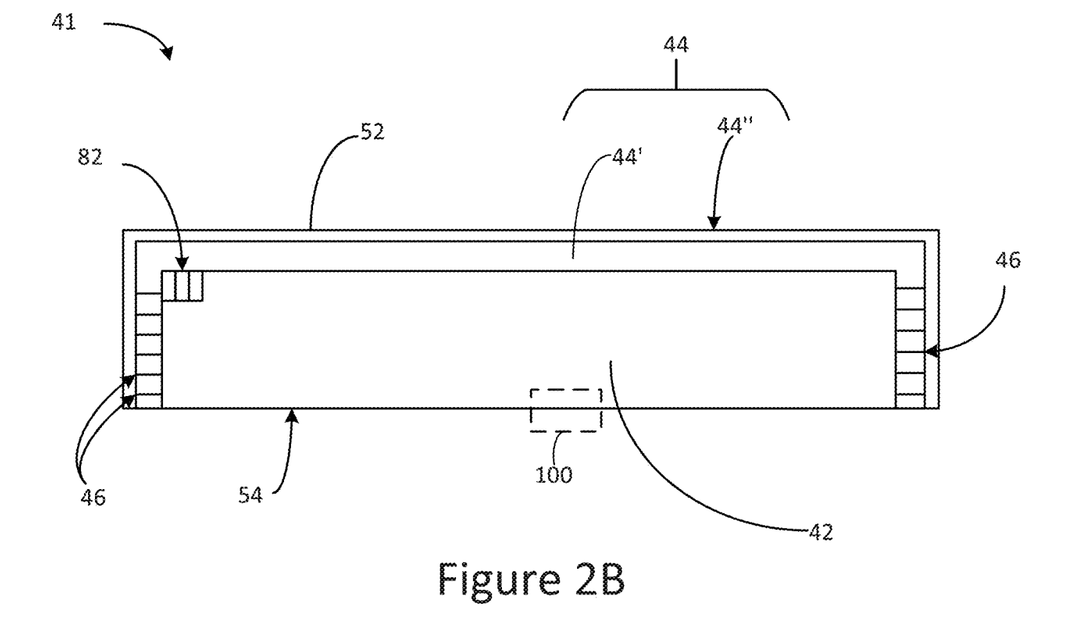
FIG. 2B illustrates a color filter substrate of the liquid crystal display device as shown in FIG. 1B, according to an embodiment.

FIG. 2B illustrates a CF substrate 41 having been cut along a cut line of the liquid crystal display panel, according to an embodiment. That is, the CF substrate 41 in FIG. 2B illustrates the CF substrate 25 (FIG. 1B) out of the liquid crystal display panel 12A. The cut line is generally selected to be between a first of the plurality of slits 46 and a second of the plurality of slits 46. Similar to FIG. 1B, the non-light transmitting layer 44' of the non-display region 44 is exposed along the cut edge 54. The cut edge 54 of the non-light transmitting layer 44' is co-planar with the cut edge 54 of the CF substrate 41. The plurality of slits 46 is parallel to the cut edge 54.

Figure 2C:
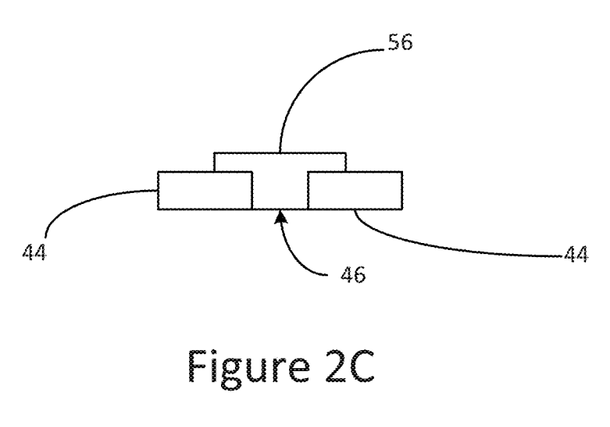
FIG. 2C illustrates an arrangement of a color filter relative to one of the plurality of slits formed in the black matrix of the display device in FIG. 2B, according to an embodiment.

FIG. 2C illustrates an arrangement of a color filter 56 relative to one of the plurality of slits 46 formed in the non-light transmitting layer 44' of the CF substrate 41 in FIG. 2B, according to an embodiment. In the illustrated embodiment, a single color filter 56 is included. It will be appreciated that one or more color filters 56 can be disposed in the plurality of slits 46. In an embodiment, the color filter 56 can be a blue color filter. In an embodiment, the color filter 56 can be a color filter other than a blue color filter. For example, the color filter 56 can alternatively be a red color filter or a green color filter. In an embodiment, the blue color filter 56 may be preferred. The color filter 56 may be inserted into the slits 46 to minimize an amount of light that leaks through the slits 46. In an embodiment, the color filter 56 can be a combination including one or more of a blue color filter, a red color filter, and a green color filter.

Figure 3:
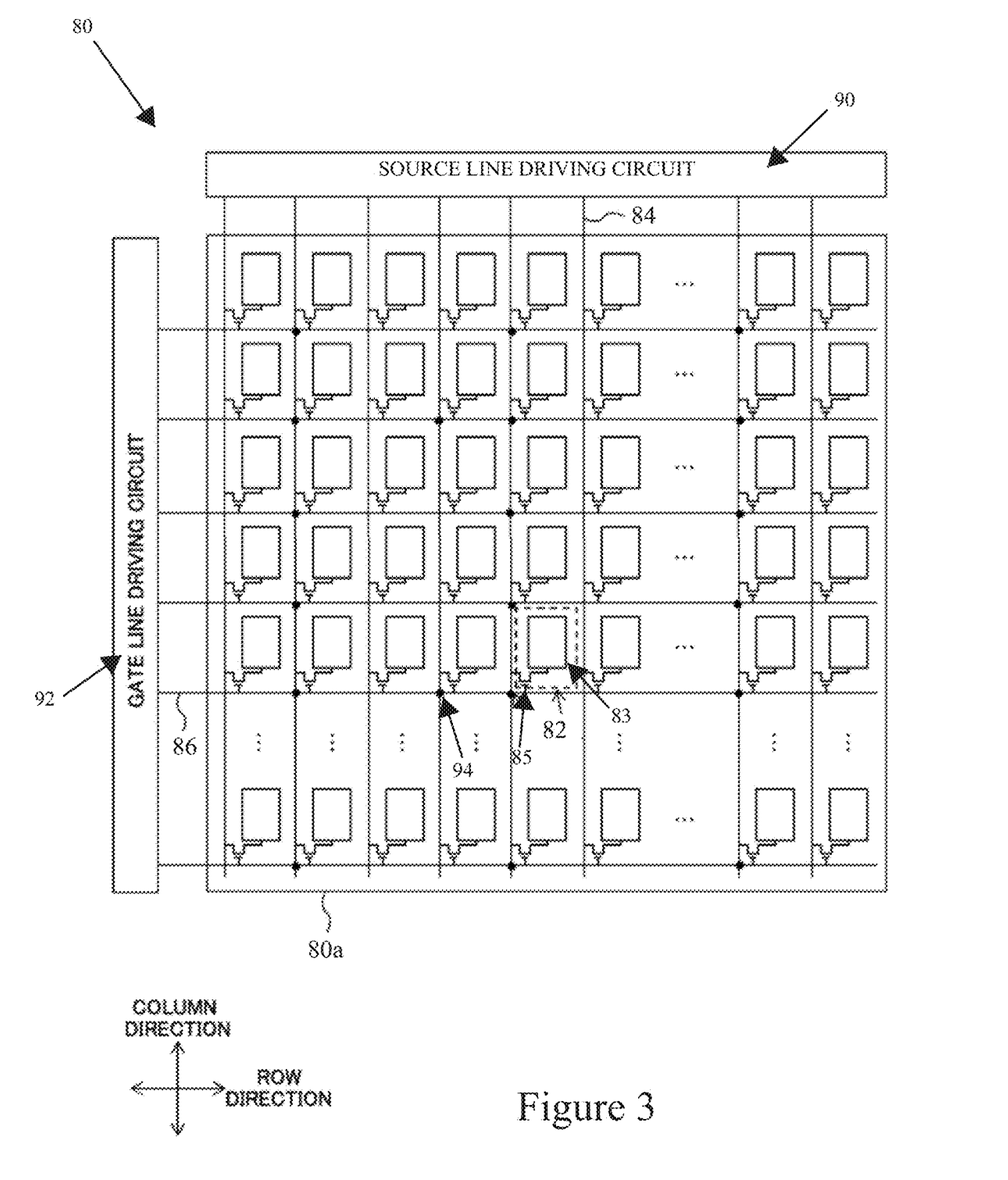
FIG. 3 illustrates a schematic diagram of a liquid crystal display device, according to an embodiment.

FIG. 3 illustrates a schematic diagram of a liquid crystal display device, according to an embodiment. The liquid crystal display device includes liquid crystal display panel 80 (e.g., the same as or similar to the liquid crystal display panel 12A in FIG. 1B) that displays an image, a driving circuit 90, 92 (source line driving circuit 90, gate line driving circuit 92) that drives the liquid crystal display panel 80, a control circuit (not illustrated) that controls the driving circuit, and a backlight (not illustrated) that irradiates the liquid crystal display panel 80 with light from a rear surface side.

In the display region 80a (e.g., the same as or similar to the display region 16 in FIG. 1B) of the liquid crystal display panel 80, pixels 82 (each of which is surrounded by two adjacent drain lines 84 and two adjacent gate lines 86) are arrayed into a matrix shape in row and column directions. It is assumed that the column direction is a direction in which drain line 84 extends, and that the row direction is a direction in which the gate line 86 extends. In one pixel 82, a pixel electrode 83 is formed and the pixel electrode 83 is connected with a thin film transistor 85 which electrically connects to a drain line 84 and a gate line 86. The thin film transistor 85 is formed at each intersecting point between each drain line 84 and each gate line 86.

Spacers 94 are disposed at locations at which the drain lines 84 and the gate lines 86 intersect to maintain a particular spacing (e.g., a gap) between the TFT substrate (e.g., TFT substrate 27) and the CF substrate (e.g., CF substrate 25).

Figure 4:
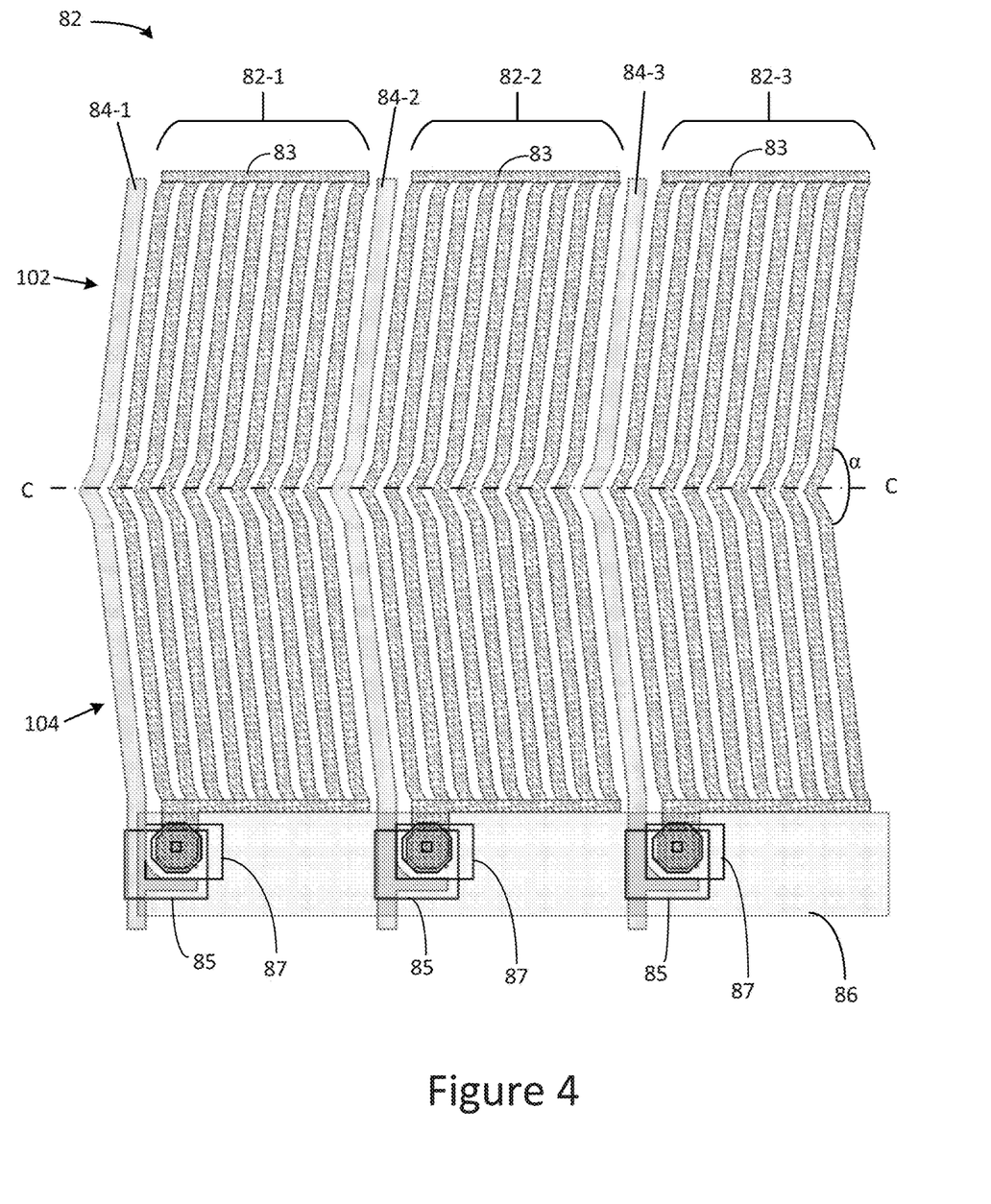
FIG. 4 is a schematic view illustrating a pixel including three subpixels, according to an embodiment.

FIG. 4 is a schematic view illustrating a pixel 82 including three subpixels 82-1, 82-2, and 82-3, according to an embodiment. Subpixel 82-1 is a subpixel that filters red light. Subpixel 82-2 is a subpixel that filters green light. Subpixel 82-3 is a subpixel that filters blue light. Each subpixel 82-1, 82-2, and 82-3 has an area that is approximately defined by an adjacent pair of gate lines 86 and an adjacent pair of drain lines 84-1, 84-2, and 84-3.

Each subpixel 82-1, 82-2, and 82-3 has a capacitor (not shown) that is electrically connected to the gate line 86 and a respective one of the drain lines 84-1, 84-2, 84-3, and a common electrode 87. The capacitor is configured to generate the electrical field for controlling the portion of the liquid crystal layer for the pixel 82.

A number of subpixels 82-1, 82-2, 82-3 for each pixel 82 is based on how many colors of filtered light the electronic display device is designed to use to form each pixel 82 in the displayed image. The ratio of 3:1 is based on each pixel 82 being configured to have a subpixel 82-1, 82-2, 82-3 for each color of light (red, green, and blue).

A black matrix (e.g., black matrix 106 in FIGS. 5A-6C) is formed overlapping the drain lines 84-1, 84-2, 84-3 and the gate lines 86. An upper half 102 of the pixel 82 and a lower half 104 of the pixel 82 are connected via the drain lines 84-1, 84-2, 84-3. The drain lines 84-1, 84-2, and 84-3 are oriented such that they are symmetrically angled relative to a centerline C-C between the upper half 102 and the lower half 104 of the pixel 82. The symmetrical angling of the drain lines 84-1, 84-2, and 84-3 can reduce a variation in color based on viewing angles by applying a multi-domain. In an embodiment, the angling of the drain lines 84-1, 84-2, 84-3 may be referred to as being oriented in a chevron shape. The chevron shape is such that an angle a is formed between the upper half 102 of the pixel 82 and the lower half 104 of the pixel 82. The centerline C-C is disposed at a point in a middle location between the upper half 102 of the pixel and the lower half 104 of the pixel.

Figure 5A:
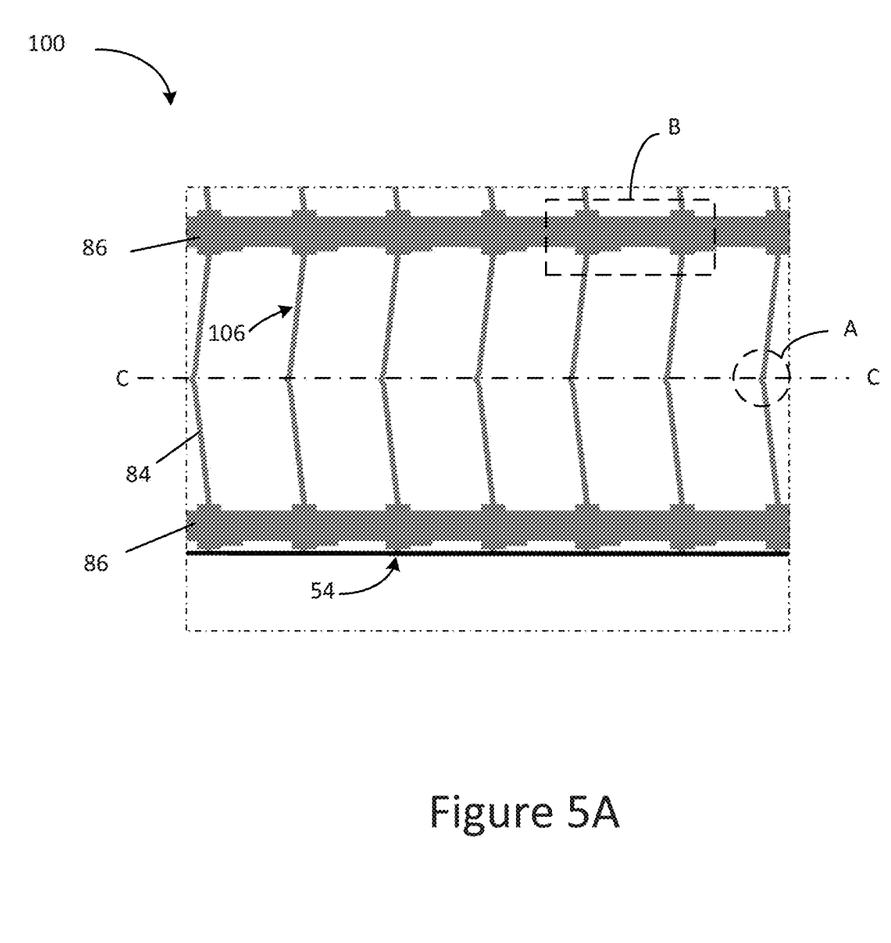
FIGS. 5A-5E illustrate a portion of the color filter substrate shown in FIG. 2B of the liquid crystal display panel in FIG. 1B, according to an embodiment.
Figure 5B:
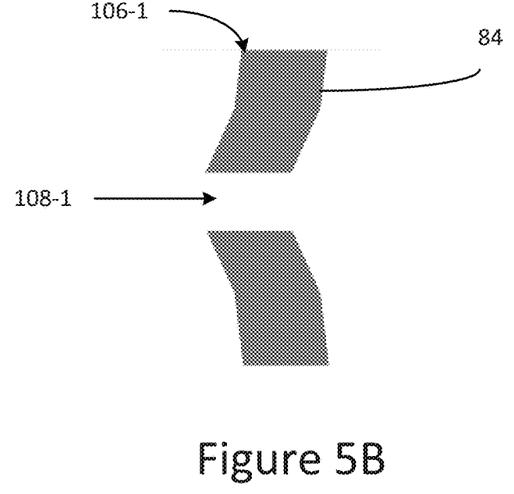
Figure 5C:
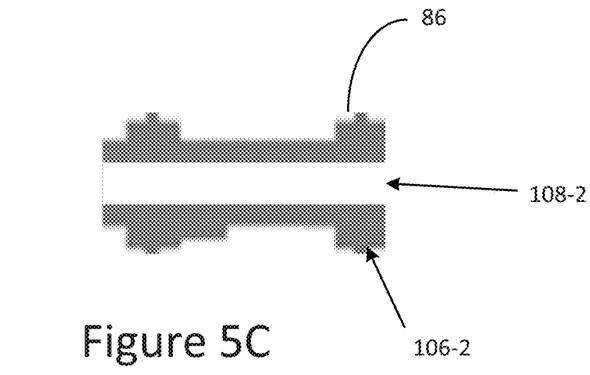
Figure 5D:
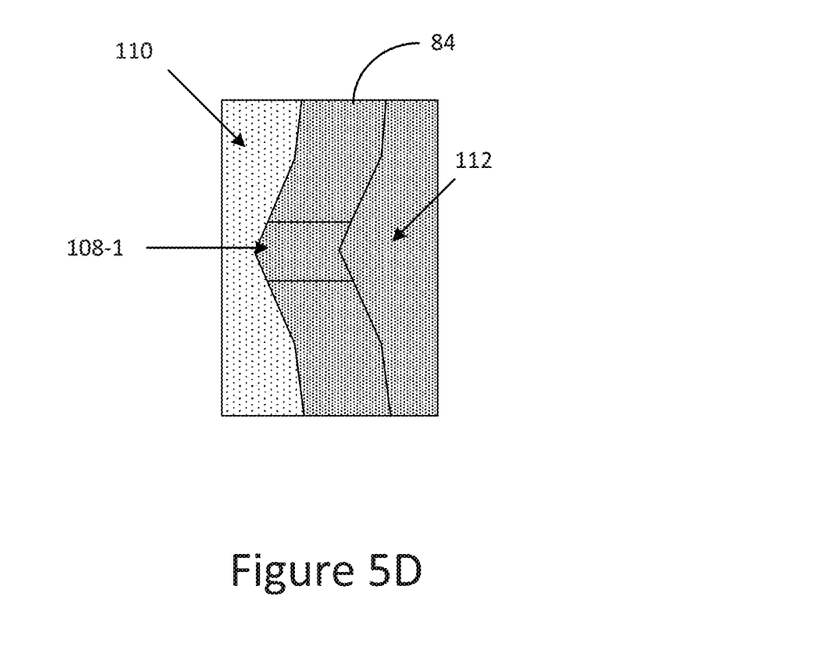

FIGS. 5A-5E illustrate a portion 100 of the CF substrate 41 shown in FIG. 2B of the liquid crystal display panel 12A in FIG. 1B, according to an embodiment. FIGS. 5B and 5D include the callout A from FIG. 5A, and FIGS. 5C and 5E include the callout B from FIG. 5A. In the portion 100 (FIG. 5A), the black matrix 106 is formed on a glass substrate. A part 106-1 (FIG. 5B) of the black matrix 106 overlaps the drain lines 84 (FIGS. 3 and 4). Another part 106-2 (FIG. 5C) of the black matrix 106 overlaps gate lines 86 (FIGS. 3 and 4). An edge of the part 106-1 of the black matrix 106 may be co-planar with the cut edge 54 of the CF substrate 41 (FIG. 2B). Therefore the black matrix 106 may become a path of propagating static electricity.

In FIGS. 5A-5E, a slit 108-1 (FIG. 5B) is formed through the part 106-1 (FIG. 5B) of the black matrix 106 overlapping the drain line 84 at a location of the centerline C-C. A part of the chevron shape generally does not contribute to aperture ratio, as liquid crystal molecules therein do not rotate desirably. Thus even if a small amount of light is leaked from the slit 108-1, the leakage would not generally reduce a quality of the image by much. The slit 108-1 (FIG. 5B) hinders static electricity from propagating through the part 106-1 (FIG. 5B) of the black matrix 106. The slit 108-1 (FIG. 5B) can be covered by two adjacent color filters 110, 112 (FIG. 5D). In an embodiment, the two adjacent color filters 110, 112 may be a blue color filter and a red color filter. The color filters 110, 112 may be used to reduce light leakage through the slit 108-1. In an embodiment, a green color filter may alternatively (or additionally) be used.

Figure 5E:
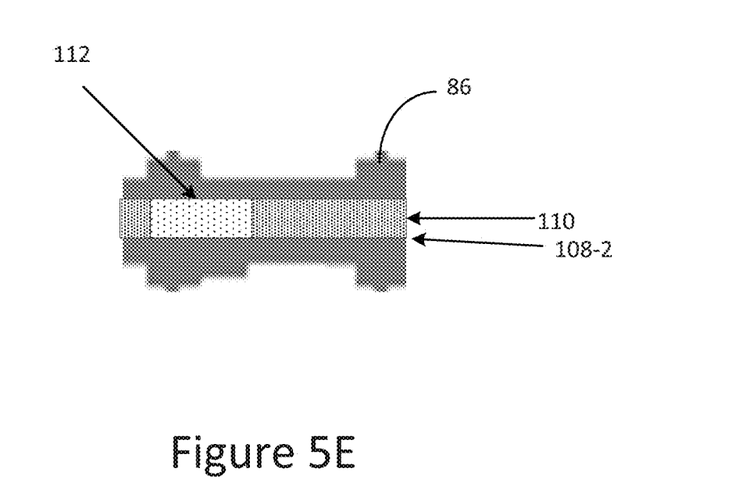

Another slit 108-2 (FIG. 5C) is additionally or alternatively formed through the part 106-2 (FIG. 5C) of the black matrix 106 overlapping with the gate line 86 and extending in a direction parallel to the gate line 86 (FIG. 3). The slit 108-2 (FIG. 5C) may be formed in a region that also overlaps with the thin film transistor. Because the part 106-2 of the black matrix 106 overlaps the gate line 86 and is relatively wide, a width of slit 108-2 can be larger than a width of slit 108-1. The slit 108-2 can be covered by a color filter 112 (FIG. 5E). In an embodiment, the color filter 110 may be one of a blue color filter, a red color filter, and a green color filter. The color filter 110 may be used to reduce light leakage through the slit 108-2. Double or triple color filters, such as a blue color filter and green or red color filters may cover the slit 108-2. Because the slit 108-2 may overlap the TFT 85 (FIG. 4), at least a part of slit 108-2 (FIG. 5E) overlapping the TFT 85 can be covered by double or triple color filters.

Figure 6A:
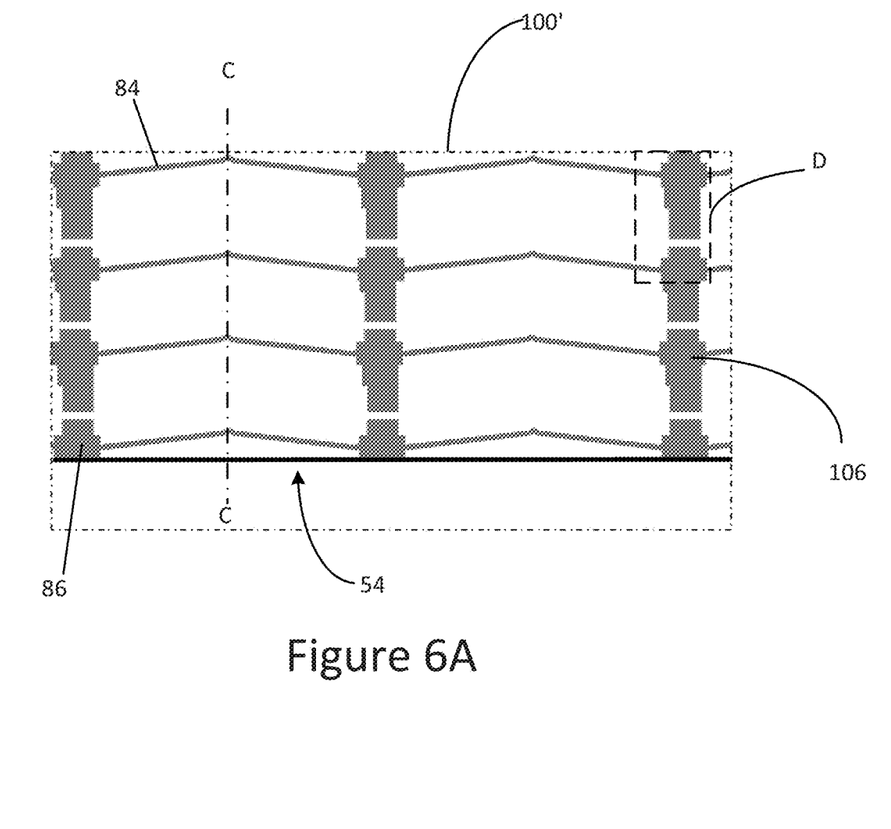
FIGS. 6A-6C illustrate a portion of the color filter substrate in FIG. 2B of the liquid crystal display panel in FIG. 1B, according to another embodiment.
Figure 6B:
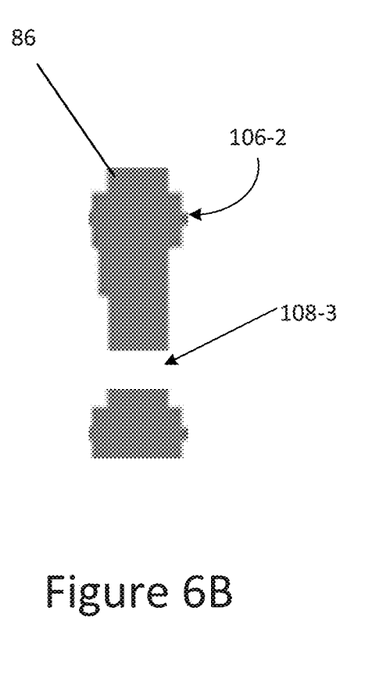
Figure 6C:
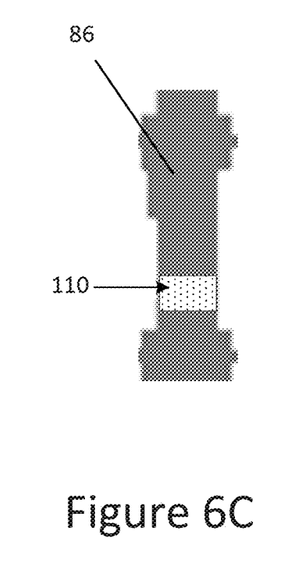

FIGS. 6A-6C illustrate a portion 100' of the CF substrate 41 in FIG. 2B of the liquid crystal display panel 12A in FIG. 1B, according to another embodiment. FIGS. 6B and 6C include the callout D from FIG. 6A. The pixel in portion 100' is rotated 90° relative to the pixel in FIGS. 5A-5E. In the portion 100', the black matrix 106 is formed on a glass substrate, including the part 106-1 which overlaps drain lines 84 and the part 106-2 (FIGS. 6B, 6C) which overlaps gate lines 86. An edge of the part 106-2 of the black matrix 106 may be coplanar with the cut edge 54 of the CF substrate 41 (FIG. 2B). Because the gate line 86 is wider than the drain line 84, the part 106-2 of the black matrix 106 overlapping the gate line 86 is likely to be wider than the part 106-1 of the black matrix 106 overlapping the drain line 84. Therefore the black matrix 106 in portion 100' may become a path of propagating more static electricity than the black matrix 106 in portion 100.

In the illustrated embodiment, a slit 108-3 (FIG. 6B) is formed through the part 106-2 of the black matrix 106 overlapping the gate line 86 and extends in a direction perpendicular to an extension of the gate lines 86. The slit 108-3 can hinder static electricity from propagating through the black matrix 106-2. The slit 108-3 may be formed overlapping with a part where a TFT is not present, because the TFT is likely to be weak against light exposure. In an embodiment, the slit 108-3 can be covered by a color filter 110 (FIG. 6C). The color filter 110 may be one of a blue color filter, a red color filter, and a green color filter. The color filter 110 may be used to reduce light leakage through the slit 108-3. Double or triple color filters, such as a blue color filter and green or red color filters may cover the slit 108-3 to reduce light leakage through the slit 108. In an embodiment, a green color filter may alternatively (or additionally) be used.

In the illustrated embodiments of FIGS. 5A-6C, the slits 108-1, 108-2, and 108-3 are shown on every pixel 82. It will be appreciated that the slits 108-1, 108-2, and 108-3 may be formed periodically, such as, but not limited to, every two or three pixels.

Aspects:

It is to be appreciated that any one of aspects 1-8 can be combined with any one of aspects 9-16 and 17-20. Any one of aspects 9-16 can be combined with any one of aspects 17-20.

Aspect 1. A liquid crystal display device, comprising: a display panel, the display panel including four sides, one of the four sides having a cut edge, the display panel including: a display region in which an image is to be displayed; a non-display region, the non-display region surrounding the display region, wherein the non-display region includes a non-light transmitting layer that restricts light transmission therethrough; and a plurality of slits disposed in the non-light transmitting layer, wherein an edge of the non-light transmitting layer is co-planar with the cut edge and the plurality of slits are parallel to the cut edge.

Aspect 2. The liquid crystal display device according to aspect 1, wherein the non-light transmitting layer is exposed from the cut edge.

Aspect 3. The liquid crystal display device according to any one of aspects 1 or 2, wherein the plurality of slits are spaced at a set spacing.

Aspect 4. The liquid crystal display device according to any one of aspects 1-3, wherein the non-light transmitting layer in the non-display region has an inner edge adjacent the display region and an outer edge spaced from the display region by the non-light transmitting layer, and the plurality of slits extend from one of the inner edge and the outer edge.

Aspect 5. The liquid crystal display device according to aspect 4, wherein the plurality of slits extend from the inner edge to the outer edge such that the slit extends entirely through the non-light transmitting layer.

Aspect 6. The liquid crystal display device according to any one of aspects 1-5, wherein the plurality of slits are covered by at least one color filter.

Aspect 7. The liquid crystal display device according to aspect 6, wherein the at least one color filter is one of a red color filter, a green color filter, and a blue color filter.

Aspect 8. The liquid crystal display device according to any one of aspects 1-7, wherein the display panel includes a length and a height, the length being larger than the height, the cut edge being along a length of the display panel, the four sides include a first side, a second side, a third side, and a fourth side, the fourth side including the cut edge, the non-light transmitting layer extends along the first side, the second side, and the third side.

Aspect 9. A liquid crystal display device, comprising: a display panel having a display region, the display region including a plurality of gate lines and a plurality of drain lines; a black matrix that overlaps the plurality of drain lines and the plurality of gate lines; and a plurality of slits are formed in the black matrix.

Aspect 10. The liquid crystal display device according to aspect 9, wherein the black matrix includes a first black matrix, the first black matrix overlapping with the plurality of drain lines, and an edge of the first black matrix is co-planar with an edge of the display panel.

Aspect 11. The liquid crystal display device according to aspect 10, further comprising a plurality of pixels formed in a matrix in the display region, a pixel from the plurality of pixels being defined by two adjacent drain lines from the plurality of drain lines and two adjacent gate lines from the plurality of gate lines, wherein each one of the plurality of drain lines is bent at a midpoint between an upper half of the pixel and an lower half of the pixel.

Aspect 12. The liquid crystal display device according to aspect 11, wherein the plurality of slits are formed at the midpoint in a direction extending along the gate lines.

Aspect 13. The liquid crystal display device according to aspect 12, wherein the plurality of slits are covered by two adjacent color filters.

Aspect 14. The liquid crystal display device according to any one of aspects 9-13, wherein the plurality of slits overlap with a thin film transistor.

Aspect 15. The liquid crystal display device according to aspect 14, wherein the plurality of slits are covered by at least two different colors of color filters.

Aspect 16. The liquid crystal display device according to any one of aspects 9-15, wherein the black matrix includes a second black matrix, the second black matrix overlapping with the plurality of gate lines is co-planar with the display panel, and the plurality of slits are perpendicular to the gate lines and extends along the drain lines.

Aspect 17. A method of manufacturing a liquid crystal display device, comprising: forming a display panel having a display region in which an image is to be displayed and a non-light transmitting layer surrounding the display region, the non-light transmitting layer that restricts light transmission therethrough; forming a plurality of slits in the non-light transmitting layer; and cutting the display panel along a cut line extending between two slits from the plurality of slits and the cut line in parallel with the plurality of slits.

Aspect 18. The method according to aspect 17, wherein the forming of the plurality of slits includes orienting the plurality of slits to be parallel to the cut line, and the method further comprises covering the plurality of slits with at least one color filter for each of the plurality of slits.

Aspect 19. The method according to any one of aspects 17 or 18, wherein the forming of the plurality of slits includes forming slits in sides of the non-display region that are perpendicular to the cut line and forming slits in a side of the non-display region that is parallel to the cut line, wherein the slits formed in the side of the non-display region that is parallel to the cut edge are oriented perpendicularly from the cut line.

Aspect 20. The method according to any one of aspects 17-20, wherein the non-light transmitting layer has an inner edge adjacent the display region and an outer edge spaced from the display region by the non-light transmitting layer, and the forming the plurality of slits includes forming so that the slit extends from the inner edge to the outer edge.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A liquid crystal display device, comprising:
    a display panel, the display panel including four sides, one of the four sides having a cut edge, the display panel including:
        a display region in which an image is to be displayed, the display region includes a plurality of pixels arrayed into a matrix shape in row and column directions, drain lines, and gate lines;
        a non-display region, the non-display region surrounds the display region, wherein the non-display region includes a non-light transmitting layer that restricts light transmission therethrough, and the non-display region includes at least two sides disposed opposite from the cut edge; and
        a plurality of slits disposed in the non-light transmitting layer,
        wherein an edge of the non-light transmitting layer is co-planar with the cut edge and the plurality of slits are parallel to the cut edge,
        wherein the plurality of slits are covered by at least one color filter.

2. The liquid crystal display device according to claim 1, wherein the non-light transmitting layer is exposed from the cut edge.

3. The liquid crystal display device according to claim 1, wherein the plurality of slits are spaced at a set spacing.

4. The liquid crystal display device according to claim 1, wherein the non-light transmitting layer in the non-display region has an inner edge adjacent the display region and an outer edge spaced from the display region by the non-light transmitting layer, and
    the plurality of slits extend from one of the inner edge and the outer edge.

5. The liquid crystal display device according to claim 4, wherein the plurality of slits extend from the inner edge to the outer edge such that the slit extends entirely through the non-light transmitting layer.

6. The liquid crystal display device according to claim 1, wherein the at least one color filter is one of a red color filter, a green color filter, and a blue color filter.

7. The liquid crystal display device according to claim 1, wherein the display panel includes a length and a height, the length being larger than the height, the cut edge being along a length of the display panel, the four sides include a first side, a second side, a third side, and a fourth side, the fourth side including the cut edge, the non-light transmitting layer extends along the first side, the second side, and the third side.

8. A liquid crystal display device, comprising:
a display panel having a display region, the display region including a plurality of gate lines and a plurality of drain lines;
a black matrix that overlaps the plurality of drain lines and the plurality of gate lines;
a color filter disposed on the plurality of drain lines and the plurality of gate lines; and
a plurality of slits are formed in the black matrix,
wherein the plurality of slits overlap with a thin film transistor.

9. The liquid crystal display device according to claim 8, wherein the black matrix includes a first black matrix, the first black matrix overlapping with the plurality of drain lines, and an edge of the first black matrix is co-planar with an edge of the display panel.

10. The liquid crystal display device according to claim 9, further comprising a plurality of pixels formed in a matrix in the display region, a pixel from the plurality of pixels being defined by two adjacent drain lines from the plurality of drain lines and two adjacent gate lines from the plurality of gate lines, wherein each one of the plurality of drain lines is bent at a midpoint between an upper half of the pixel and an lower half of the pixel.

11. The liquid crystal display device according to claim 10, wherein the plurality of slits are formed at the midpoint in a direction extending along the gate lines.

12. The liquid crystal display device according to claim 11, wherein the plurality of slits are covered by two adjacent color filters.

13. The liquid crystal display device according to claim 8, wherein the black matrix includes a second black matrix, the second black matrix overlapping with the plurality of gate lines is co-planar with the display panel, and
the plurality of slits are perpendicular to the gate lines and extends along the drain lines.

14. A method of manufacturing a liquid crystal display device, comprising:

forming a display panel having a display region in which an image is to be displayed, the display region including:
a plurality of pixels arrayed into a matrix shape in row and column directions,
drain lines, and
gate lines, and
forming a non-display region that surrounds the display region, the non-display region including a non-light transmitting layer that restricts light transmission therethrough;
forming a plurality of slits in the non-light transmitting layer; and
cutting the display panel along a cut line extending between two slits from the plurality of slits and the cut line in parallel with the plurality of slits,
wherein the forming of the plurality of slits includes orienting the plurality of slits to be parallel to the cut line, and the method further comprises covering the plurality of slits with at least one color filter for each of the plurality of slits, wherein the non-display region includes at least two sides disposed opposite from the cut edge following the cutting.

15. The method according to claim 14, wherein the forming of the plurality of slits includes forming slits in sides of the non-display region that are perpendicular to the cut line and forming slits in a side of the non-display region that is parallel to the cut line,
wherein the slits formed in the side of the non-display region that is parallel to the cut edge are oriented perpendicularly from the cut line.

16. The method according to claim 14, wherein the non-light transmitting layer has an inner edge adjacent the display region and an outer edge spaced from the display region by the non-light transmitting layer, and the forming the plurality of slits includes forming so that the slit extends from the inner edge to the outer edge.

17. The liquid crystal display device according to claim 1, wherein part of the at least one color filter is positioned on top of the non-light transmitting layer.

18. The liquid crystal display device according to claim 1, wherein part of the at least one color filter is positioned at a liquid crystal layer side of the non-light transmitting layer.

19. The liquid crystal display device according to claim 1, further comprising a substrate on which the at least one color filter is formed, wherein part of the non-light transmitting layer is disposed between the at least one color filter and the substrate.

20. The liquid crystal display device according to claim 8, further comprising a substrate on which at least one color filter is formed, and part of the black matrix is disposed between the at least one color filter and the substrate.

* * * * *